US010444773B1

(12) United States Patent
Rowe

(10) Patent No.: US 10,444,773 B1
(45) Date of Patent: Oct. 15, 2019

(54) PRESSURE REGULATING VALVE WITH MULTI-PRONGED PISTON ASSEMBLY

(71) Applicant: Carroll G. Rowe, Washington, AR (US)

(72) Inventor: Carroll G. Rowe, Washington, AR (US)

( * ) Notice: Subject to any disclaimer, the term of this patent is extended or adjusted under 35 U.S.C. 154(b) by 27 days.

(21) Appl. No.: 15/714,406

(22) Filed: Sep. 25, 2017

Related U.S. Application Data

(63) Continuation-in-part of application No. 15/493,415, filed on Apr. 21, 2017, now Pat. No. 10,203,705, and a continuation-in-part of application No. 15/206,037, filed on Jul. 8, 2016, now Pat. No. 9,891,635.

(60) Provisional application No. 62/460,755, filed on Feb. 18, 2017, provisional application No. 62/333,451, filed on May 9, 2016, provisional application No. 62/326,056, filed on Apr. 22, 2016, provisional application No. 62/190,630, filed on Jul. 9, 2015.

(51) Int. Cl.
  *G05D 16/10* (2006.01)
  *F16K 15/02* (2006.01)
  *F16K 1/12* (2006.01)

(52) U.S. Cl.
  CPC ........... *G05D 16/106* (2013.01); *F16K 1/126* (2013.01); *F16K 15/026* (2013.01); *F16K 15/028* (2013.01); *Y10T 137/7913* (2015.04); *Y10T 137/7915* (2015.04); *Y10T 137/7925* (2015.04); *Y10T 137/7931* (2015.04); *Y10T 137/7935* (2015.04); *Y10T 137/7937* (2015.04); *Y10T 137/7938* (2015.04); *Y10T 137/7939* (2015.04)

(58) Field of Classification Search
  CPC ......... Y10T 137/7925; Y10T 137/7931; Y10T 137/7935; Y10T 137/7937; Y10T 137/7938; Y10T 137/7913; Y10T 137/7915; Y10T 137/7939; Y10T 137/7808; F16K 15/026; F16K 15/028; F16K 17/0413; F16K 1/126; G05D 16/106
  See application file for complete search history.

(56) References Cited

U.S. PATENT DOCUMENTS

| | | | | |
|---|---|---|---|---|
| 446,782 | A * | 2/1891 | Loftus | F16K 17/0433 137/469 |
| 6,564,828 | B1 * | 5/2003 | Ishida | F16F 1/06 137/515.5 |
| 8,424,561 | B1 * | 4/2013 | Rowe | A62C 5/02 137/508 |
| 2011/0033289 | A1 * | 2/2011 | Tseng | A47L 9/00 415/208.1 |
| 2011/0174394 | A1 * | 7/2011 | Kristoffersen | G05D 7/0133 137/505 |
| 2014/0361202 | A1 * | 12/2014 | Maljanian | F16K 31/124 251/30.01 |

* cited by examiner

*Primary Examiner* — Atif H Chaudry

(57) ABSTRACT

A pressure regulator includes a pronged piston positioned inside an internal chamber, such that the pronged piston moves longitudinally along the axis of the internal chamber in response to the pressures exerted on the piston by a liquid flowing through the regulator. The piston has a first disk and a second disk connected by a number of prongs. The second disk is configured to seal the inlet port of the pressure regulator when the piston is in a closed position and the number or prongs act as guides for the piston as it slides within the internal chamber.

19 Claims, 4 Drawing Sheets

US 10,444,773 B1

PRESSURE REGULATING VALVE WITH MULTI-PRONGED PISTON ASSEMBLY

CROSS-REFERENCE TO RELATED APPLICATIONS

This application claims is a continuation-in-part of U.S. patent application Ser. No. 15/206,037, filed on Jul. 8, 2016, and entitled "Dual-Piston Pressure Reducer", and is also a continuation-in-part of U.S. patent application Ser. No. 15/493,415, filed on Apr. 21, 2017, and entitled "Pressure Reducing Valve with Incorporated Shut-Off Mechanism." The complete disclosures of these applications are hereby incorporated by reference.

STATEMENT REGARDING FEDERALLY SPONSORED RESEARCH OR DEVELOPMENT

Not applicable.

BACKGROUND OF THE INVENTION

Pressure control valves, or pressure regulators, are used to automatically increase, decrease, turn on, turn off, or otherwise regulate the flow of a liquid or gas at certain pressures. In many cases, these valves serve to maintain a reduced outlet pressure regardless of variations in the inlet pressure of the fluid. These types of pressure reducing valves are used primarily for safety purposes and can be implemented in a variety of areas, including the aircraft industry, cooking, the oily and gas industry, and many others. In one application, pressure control valves are used in compressed air foam systems (CAFS) used for firefighting, in which the value may be used to deliver an appropriate quantity of water or a mixture of water and surfactant. Many existing pressure control valves and regulators use a spring loaded poppet valve as the pressure reducing or restrictive element and a diaphragm to sense the pressure changes. A spring is typically used to exert a force on the sensing element and to open the valve.

BRIEF SUMMARY OF THE INVENTION

The present invention is directed to a pressure control valve or flow regulator with an incorporated shut-off mechanism for use between a pressurized liquid source and a pump inlet (the pump inlet being fluidically connected to the pressure regulator outlet). The flow regulator uses a piston with one or more attached appendages or prongs. Rather than using a poppet valve, the piston moves longitudinally within a pressure chamber along the axis of the pressure chamber as the pressure regulating component of the valve. The piston is capable of moving freely toward and away from the inlet port, allowing the user to control the flow through the pressure chamber to the discharge port. The piston, when positioned entirely rearward such that it contacts the inlet port, is able to prevent the flow of liquid into the discharge port altogether.

When used in a compressed air foam system, the invention allows the engine powering the system to run at an increased rpm at the same discharge pressure. This provides numerous advantages in practical firefighting applications. This invention is also advantageous in foam concentrate proportioning systems using what is commonly called "around the pump" systems, where a portion of the discharge pump is routed through a venturi back into the suction side of the pump. In this use, the venturi is used to introduce foam concentrate into the stream of water being pumped. For the venturi to be effective in producing the volume of foam concentrate required, a specified differential of pressure between the inlet and pressure side of the pump is necessary. The invention is capable of producing this differential of pressure.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
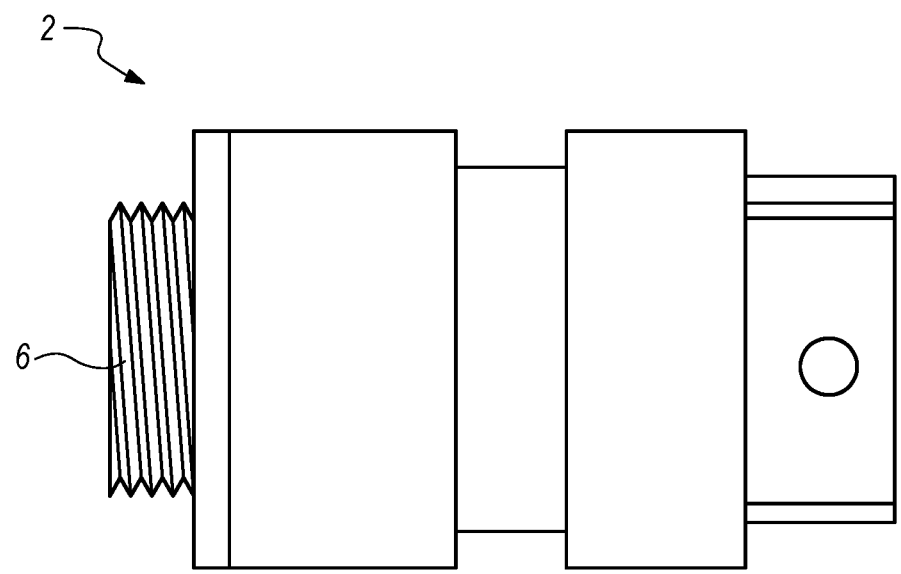
FIG. 1 shows a side view of a fully assembled pressure regulator according to one embodiment of the present invention.
Figure 2:
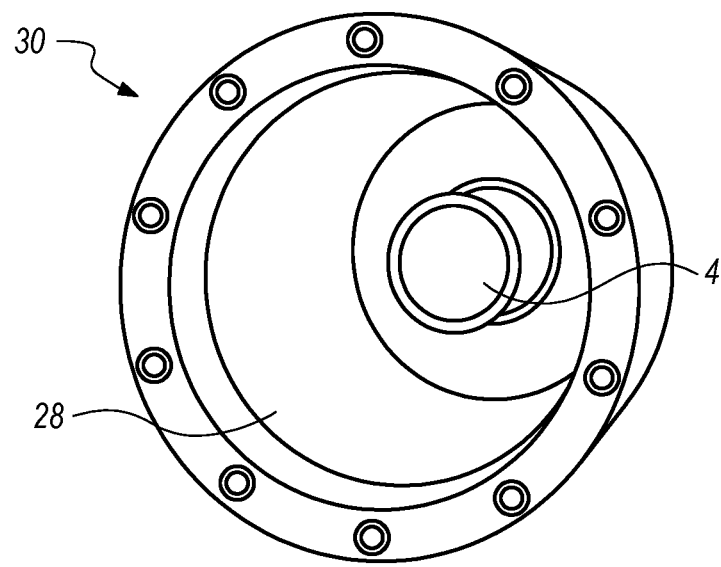
FIG. 2 shows an internal perspective view of the pressure regulator facing toward the inlet according to one embodiment of the present invention.
Figure 3:
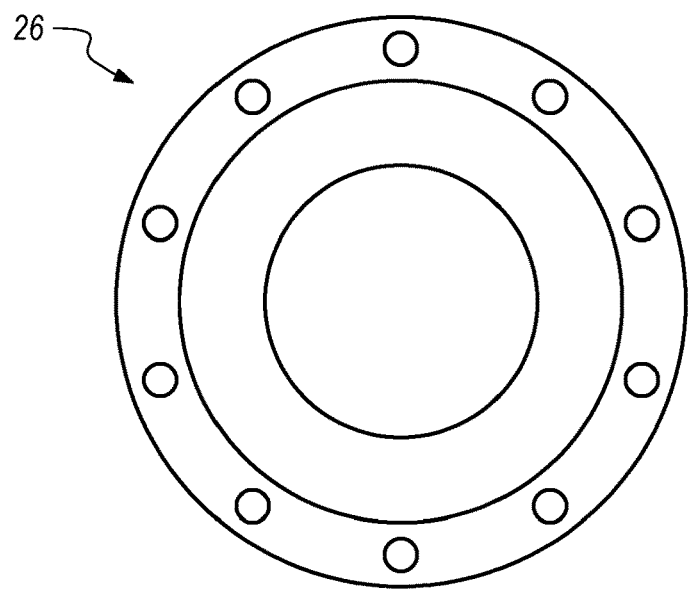
FIG. 3 shows an end cap of a pressure regulator according to one embodiment of the present invention.

In one aspect the present invention is directed to a specially designed piston for use in a single-piston pressure regulator with incorporated shut off mechanism. With regard to FIGS. 1-8, the general design for one embodiment of the pressure regulator 2 of the present invention may be described. The pressure regulator 2 generally comprises a pressure chamber 30 and a piston 8 configured to be positioned inside the pressure chamber 30. The pressure chamber 30 has an inner surface 28, an inlet port 4 at one end of the chamber 30, and an outlet port 6 at the opposite end. The inlet port 4 and outlet port 6 are fluidically connected by the pressure chamber 30. These components are preferably housed by a metal body, which may be made up of several different pieces fit together to create the regulator 2 body. Furthermore, the pressure chamber 30 is preferably cylindrical in shape, but other variations may be used.

The inlet port 4 is configured to receive a liquid from a pressurized liquid source. The source may be, for example, a water tank, or water that is mixed with a surfactant either in a tank, or in a line that feeds the water from the tank to inlet port 4. The inlet port 4 is fluidically connected to the pressure chamber 30 such that the liquid is received through the flow inlet port 4 into the pressure chamber 30. A piston 8 (described in detail below) is situated inside the pressure chamber 30. The piston 8 is configured to move longitudinally within the pressure chamber 30 along the axis of the pressure chamber 30 due to the pressure of the liquid received into the pressure chamber 30. As the piston 8 moves in the pressure chamber 30, the liquid is capable of exiting the pressure chamber 30 through the outlet port 6. As liquid flows in and out of the pressure chamber 30, the liquid exerts forces on various parts of the piston 8, which move the piston 8 longitudinally in both directions. The movement of the piston 8 within the pressure chamber 30 regulates the flow of the liquid out of the pressure chamber 30, as described in detail below.

Figure 4:
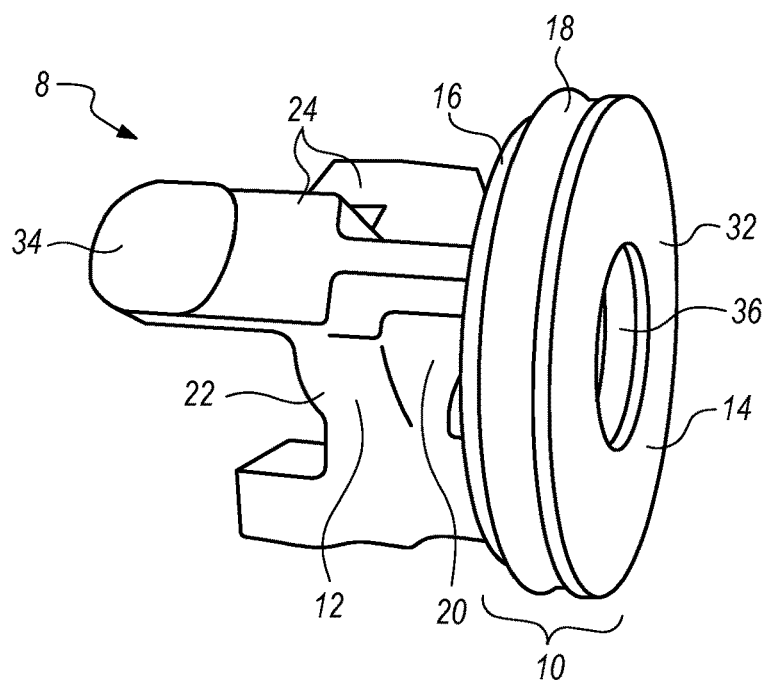
FIG. 4 shows a first side view of a pronged piston according to one embodiment of the present invention.
Figure 5:
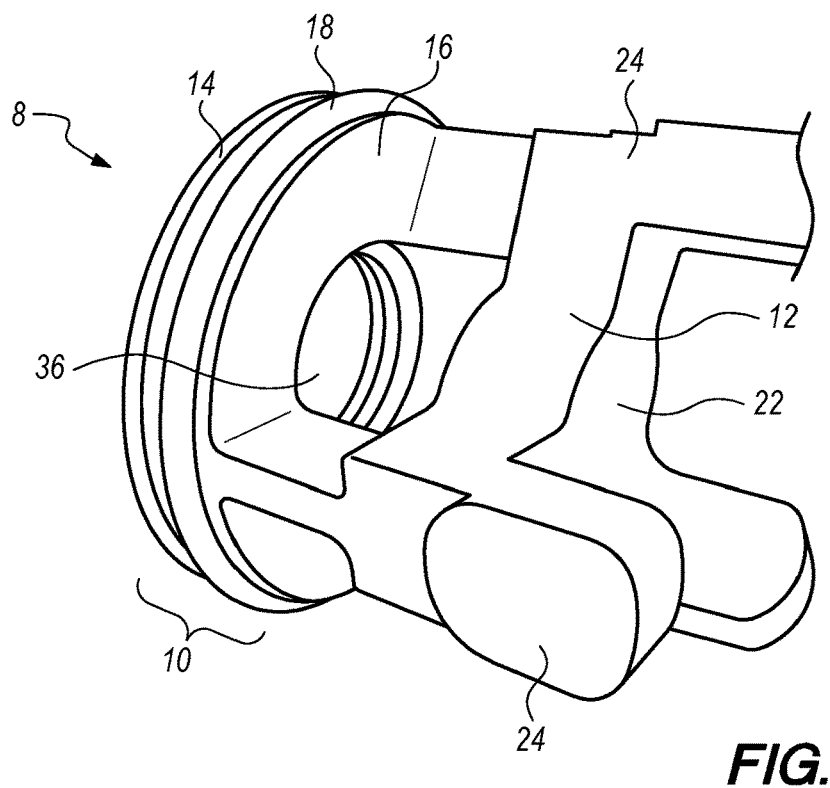
FIG. 5 shows a second side view of a pronged piston according to one embodiment of the present invention.
Figure 6:
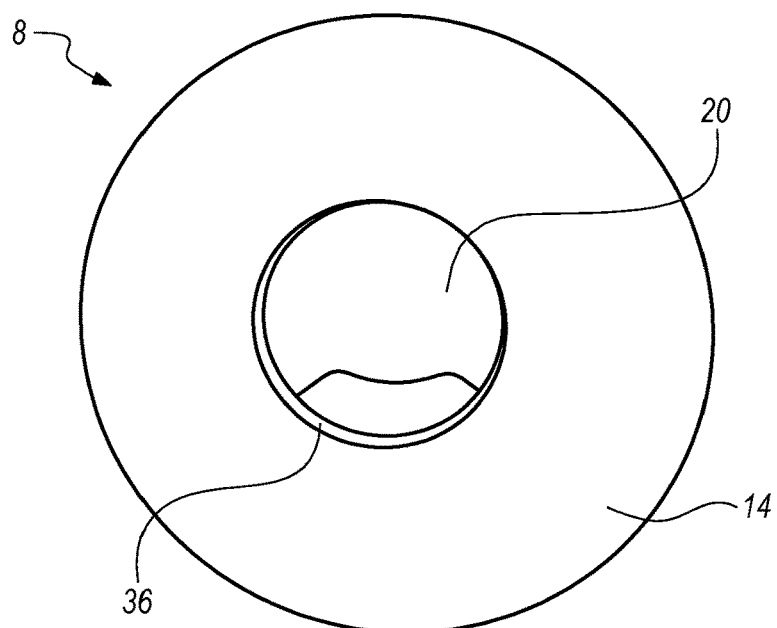
FIG. 6 shows a first end view of a pronged piston according to one embodiment of the present invention.
Figure 7:
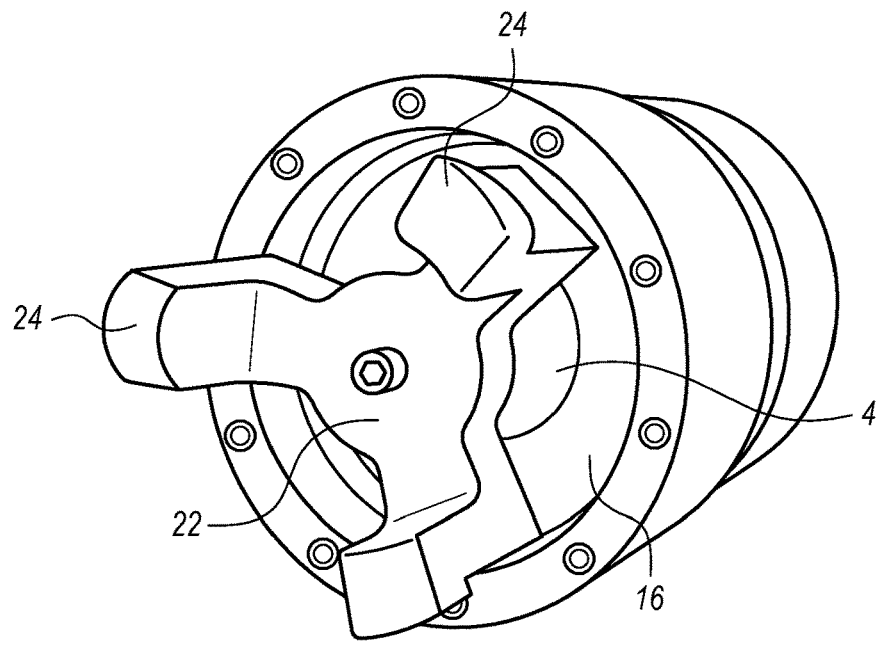
FIG. 7 shows a second end view of a pressure regulator with a partially installed pronged piston according to one embodiment of the present invention.
Figure 8:
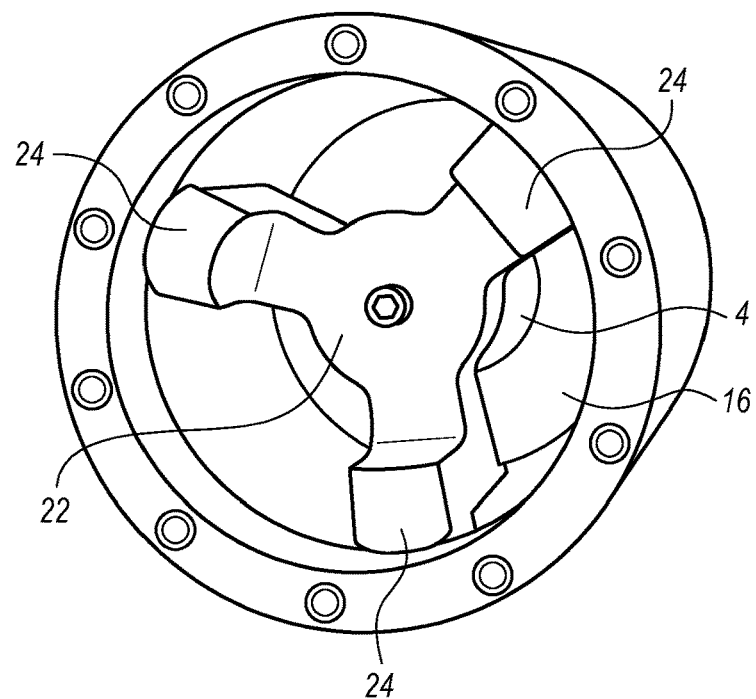
FIG. 8 shows a second end view of a pressure regulator with a fully installed pronged piston according to one embodiment of the present invention.

With regard to FIGS. 4-6, the general design for one embodiment of the piston 8 component of the present invention may be described. Generally speaking, the piston 8 has a forward end 34 and a rearward end 32. The forward end 34 of the piston is positioned nearer to the outlet end 6 of the chamber 30 and the rearward end 32 of the piston 8 is positioned nearer the inlet end 4 of the chamber 30. A vent 35 is positioned through chamber 30 in front of forward end 34; vent 30 is open to the atmosphere, thereby allowing piston 8 to move within chamber 30 without being impeded by suction or pressure at forward end 34. The rearward end 32 of the piston 8 has a rearward disk 10 that has substantially the same shape as the cross section of the pressure chamber 30. For example, a generally circular rearward disk 10 may be used with a generally cylindrical pressure chamber 30, with the circular rearward disk 10 having the same circumference of the inner surface of the cylindrical chamber 30. A sealing ring 18 may be placed around the rearward disk 10 such that no liquid can travel around the disk 10. The rearward disk 10 of the piston 8 has a front surface 16 and a back surface 14. An aperture 36 is located in the rearward disk 10 such that the rearward disk 10 takes a generally ring-like shape. The aperture 36 is configured to allow the rearward disk 10 to fit around the inlet port 4 of the regulator 2 when the piston 8 is in the rearward position (described below).

Connected to the rearward disk 10 of the piston 8 is a forward disk 12, with the forward disk 12 being a substantially solid disk having a front surface 22 and a back surface 20. The rearward disk 10 and forward disk 12 are spaced apart along the axis of the piston 8, and the forward disk 12 is preferably centered at the center axis of the chamber 30. In the preferred embodiment, the forward disk 12 of the piston 8 is smaller than the rearward disk 10 of the piston 8. For example, the forward disk 12 of the piston 8 is preferably a solid disk that is substantially the same size as the aperture 36 of the rearward disk 10 of the piston 8. As mentioned previously, the aperture 36 of the rearward disk 10 is configured to fit around the inlet port 4 of the chamber 30 when the piston 8 is in the rearward (or closed) position. Because the forward disk 12 is positioned spaced apart from the rearward disk 10 and is similar to size to the opening port 4, the opening port 4 can extend through the aperture 36 of the rearward disk 10 until it meets the solid surface of the forward disk 12. The solid surface of the forward disk 12, then, acts to stop the liquid flow from the inlet port 4 when the piston 8 is in the closed position (i.e. is positioned such that the solid surface of the forward disk 12 closes the inlet port, as described below).

The forward disk 12 of the piston 8 and the rearward disk 10 of the piston 8 are connected to one another by a number of prongs or appendages 24. While the preferred embodiment of the piston 8 shows three prongs 24, any number of prongs 24 may be used. The prongs 24 connect the front surface 16 of the rearward disk 10 to arms extending radially from the sides of forward disk 12. The connection of these disks 10, 12 serves to allow the disks 10, 12 to move as a single unit when liquid is introduced to the chamber 30, which is described more fully below. The prongs 24 also extend past the forward disk 12 toward the outlet port 4 of the chamber 30. These prongs 24 act as guides for the piston 8 as they slide along the inner surface of the chamber 30. The prongs 24 also hold the piston 8 in place and provide a stop against the outlet 6 to keep the piston 8 from exiting the chamber 30. The ends of the prongs 24 are configured to hit a lip on the inside surface of the outlet end 6 of the chamber 30 when the piston 8 is in the fully forward position (i.e. when the piston has moved longitudinally toward the outlet port 4, as described below).

The structure of the regulator 2 and piston 8 of the present invention being described, the operation of the regulator 2 may now be described. Generally speaking, a pressurized liquid flows from a pressurized liquid source through the inlet port 4 and into the chamber 30. This flow of liquid will exert a pressure on the back surface 20 of the forward disk 12 of the piston 8. This exertion of pressure on the back surface 20 of the forward disk 12 of the piston 8 moves the piston 8 forward toward the outlet end 6 of the chamber 30. As the piston 8 moves forward, pressure is exerted on the back surface 20 of the forward disk 12, moving the piston 8 longitudinally toward the outlet 6 and away from the inlet 4. Thus, the solid forward disk 12 moves from near the inlet port 4 (where in the closed position the forward disk 12 seals the inlet port 4) toward the outlet port 6, allowing full flow into the chamber 30. Once the piston 8 moves completely forward, the prongs 24 on the piston 8 act to stop the piston 8 from moving any further forward in the chamber 30.

As the liquid flows into chamber 30 from the inlet port 4, pressure beings to build in the chamber 30. As pressure builds in the chamber 30, the liquid exerts a force on the front face 22 of the forward disk 12 and the front face 16 of the rearward disk (ring) 10, which in turn causes the piston 8 to move longitudinally in a rearward direction (i.e. toward the inlet port 4). This rearward movement of the piston 8 occurs until the pressure exerted on the front faces 22, 16 of the disks 12, 10 and the pressure exerted on the back face 20 of the disks 12, 10 equalize, thus creating a regulation of the pressure of liquid that flows out of the outlet port 6. The precise position at which the piston 8 reaches equilibrium may be modified by varying the areas of the forward disk 12 and rearward disk 10.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain embodiment(s) that are intended to be exemplary only and not limiting to the full scope of the present invention as set forth in the following claims.

The invention claimed is:

1. A pressure regulator for regulating the flow of a liquid from a pressurized liquid source, the pressure regulator comprising:
   a. an inlet port;
   b. an outlet port;
   c. an internal chamber fluidically connecting the inlet port and the outlet port, the internal chamber having an inner surface; and
   d. a piston positioned inside the internal chamber, the piston comprising:
      i. a first disk comprising an aperture configured to slide around the inlet port;
      ii. a second disk; and
      iii. a number of appendages extending from the first disk to the second disk, thereby connecting the first disk and second disk, further wherein a portion of each of the number of appendages extends past the second disk;
   wherein the piston is configured to slide longitudinally within the internal chamber, and wherein the portion of each of the number of appendages extending past the second disk is configured to slide along the inner surface of the internal chamber as the piston slides longitudinally within the internal chamber.

2. The pressure regulator of claim 1, wherein the second disk is configured to seal the inlet port when the piston is in a closed position.

3. The pressure regulator of claim 1, wherein the number of appendages is at least three appendages.

4. The pressure regulator of claim 1, wherein the first disk comprises an outer circumference configured to slide along the inner surface of the internal chamber.

5. The pressure regulator of claim 4, wherein the outer circumference of the first disk comprises a sealing ring configured to create a seal between the outer circumference of the first disk and the inner surface of the internal chamber.

6. The pressure regulator of claim 1, wherein the outlet port comprises a head cap having a flat taper configured to engage the number of appendages when the piston is in a fully open position.

7. The pressure regulator of claim 1, wherein the first disk has a first surface area and the second disk has as second surface area, wherein the first surface area is greater than the second surface area.

8. A pressure regulator for regulating the flow of a liquid from a pressurized liquid source, the pressure regulator comprising:
   a. an inlet port;
   b. an outlet port;
   c. an internal chamber fluidically connecting the inlet port and the outlet port, the internal chamber having an inner surface; and
   d. a piston positioned inside the internal chamber, the piston comprising:
      i. a first disk;
      ii. a second disk, wherein the second disk is configured to seal the inlet port when the piston is in a closed position; and
      iii. a number of appendages extending from the first disk to the second disk, thereby connecting the first disk and second disk, further wherein a portion of each of the number of appendages extends past the second disk;
   wherein the piston is configured to slide longitudinally within the internal chamber, and wherein the portion of each of the number of appendages extending past the second disk is configured to slide along the inner surface of the internal chamber as the piston slides longitudinally within the internal chamber.

9. The pressure regulator of claim 8, wherein the first disk comprises an aperture configured to slide around the inlet port.

10. The pressure regulator of claim 8, wherein the number of appendages is at least three appendages.

11. The pressure regulator of claim 8, wherein the first disk comprises an outer circumference configured to slide along the inner surface of the internal chamber.

12. The pressure regulator of claim 11, wherein the outer circumference of the first disk comprises a sealing ring configured to create a seal between the outer circumference of the first disk and the inner surface of the internal chamber.

13. The pressure regulator of claim 8, wherein the first disk has a first surface area and the second disk has as second surface area, wherein the first surface area is greater than the second surface area.

14. A pressure regulator for regulating the flow of a liquid from a pressurized liquid source, the pressure regulator comprising:
   a. an inlet port;
   b. an outlet port;
   c. an internal chamber fluidically connecting the inlet port and the outlet port, the internal chamber having an inner surface; and
   d. a piston positioned inside the internal chamber, the piston comprising:
      i. a first disk comprising an outer circumference configured to slide along the inner surface of the internal chamber;
      ii. a second disk; and
      iii. a number of appendages extending from the first disk to the second disk, thereby connecting the first disk and second disk, further wherein a portion of each of the number of appendages extends past the second disk;
   wherein the piston is configured to slide longitudinally within the internal chamber, and wherein the portion of each of the number of appendages extending past the second disk is configured to slide along the inner surface of the internal chamber as the piston slides longitudinally within the internal chamber.

15. The pressure regulator of claim 14, wherein the first disk comprises an aperture configured to slide around the inlet port.

16. The pressure regulator of claim 14, wherein the second disk is configured to seal the inlet port when the piston is in a closed position.

17. The pressure regulator of claim 14, wherein the number of appendages is at least three appendages.

18. The pressure regulator of claim 14, wherein the outer circumference of the first disk comprises a sealing ring configured to create a seal between the outer circumference of the first disk and the inner surface of the internal chamber.

19. The pressure regulator of claim 14, wherein the first disk has a first surface area and the second disk has as second surface area, wherein the first surface area is greater than the second surface area.

* * * * *